United States Patent [19]

Oyama et al.

[11] Patent Number: 4,732,407
[45] Date of Patent: Mar. 22, 1988

[54] SUSPENSION SYSTEM FOR A MOTOR VEHICLE

[75] Inventors: Fusami Oyama, Ohra; Shingo Ohbayashi; Akira Takahashi, both of Ohta; Hiroshi Mori, Ohizumi; Takeo Inoue, Ohta, all of Japan

[73] Assignee: Fuji Jukogyo Kabushiki Kaisha, Tokyo, Japan

[21] Appl. No.: 56,872

[22] Filed: Jun. 1, 1987

[30] Foreign Application Priority Data

| Jun. 10, 1986 | [JP] | Japan | 61-134425 |
| Jun. 10, 1986 | [JP] | Japan | 61-134426 |
| Jun. 10, 1986 | [JP] | Japan | 61-134428 |
| Jun. 10, 1986 | [JP] | Japan | 61-134429 |
| Jun. 10, 1986 | [JP] | Japan | 61-134430 |
| Jun. 10, 1986 | [JP] | Japan | 61-134431 |

[51] Int. Cl.$^4$ .................................. B60G 17/04
[52] U.S. Cl. .................... 280/673; 267/293; 280/707
[58] Field of Search ............ 280/673, 674, 690, 701, 280/707; 267/293

[56] References Cited

U.S. PATENT DOCUMENTS

| 4,616,846 | 10/1986 | Furuya et al. | 280/673 |
| 4,687,223 | 8/1987 | Miyoshi et al. | 280/707 |

FOREIGN PATENT DOCUMENTS

| 3619755 | 12/1986 | Fed. Rep. of Germany | 280/701 |
| 60-146707 | 8/1985 | Japan . | |

Primary Examiner—John J. Love
Assistant Examiner—Ross Weaver
Attorney, Agent, or Firm—Martin A. Farber

[57] ABSTRACT

A suspension system has at least one swing member for pivotally connecting one of wheels of the motor vehicle to a body of the vehicle. The swing member is rotatably supported on a shaft through an annular rubber bush secured to the shaft. The annular rubber bush has spring constants which are different in value at angular positions. Accordingly, by rotating the shaft, the spring constants with respect to the swing member are changed.

5 Claims, 16 Drawing Figures

SUSPENSION SYSTEM FOR A MOTOR VEHICLE

BACKGROUND OF THE INVENTION

The present invention relates to a suspension system for a motor vehicle.

A suspension system having a swing member such as an arm or link for pivotally connecting a wheel to a body of a motor vehicle is used. An end of the swing member is pivoted on the body through an elastic member such as rubber bush. The spring constant of the elastic member is determined to meet requirements of reduction of vibration of the body and noises, and improvement of steerability.

Japanese Patent Laid Open No. 60-146707 discloses a suspension system in which a hollow elastic member is disposed on a pivot of a swing member and the chamber of the elastic member is filled with oil. The spring constant is controlled by changing the pressure of oil in the chamber. However, the elastic member such as a rubber bush becomes deteriorated with the time by high pressure oil. Further, it is difficult to properly control the spring constant by changing the pressure of oil.

SUMMARY OF THE INVENTION

The object of the present invention is to provide a suspension system in which the spring constant of an elastic member disposed on a pivot of a swing member changes with the change of the angular position thereof, and a control system is provided to control the angular position in accordance with driving conditions.

According to the present invention, there is provided a suspension system for a motor vehicle having at least one swing member for pivotally connecting one of wheels of the motor vehicle to a body of the vehicle. The system comprises a shaft rotatably supported on the body, an annular elastic bush secured to the shaft, the annular elastic bush having spring constants which are different in value at angular positions, the swing member being rotatably engaged with the elastic bush, and means for rotating the shaft in accordance with driving conditions of the motor vehicle so as to change the spring constants with respect to the swing member.

In an aspect of the invention, the annular elastic bush comprises an inner sleeve secured to the shaft, an outer sleeve rotatably engaged with an end of the swing member, an annular rubber member disposed between the inner and outer sleeves and secured thereto, and the annular rubber member has a pair of diametrically opposed slits.

The other objects and features of this invention will be apparently understood from the following description with reference to the accompanying drawings.

DETAILED DESCRIPTION OF THE PREFERRED EMBODIMENT

Figure 1:
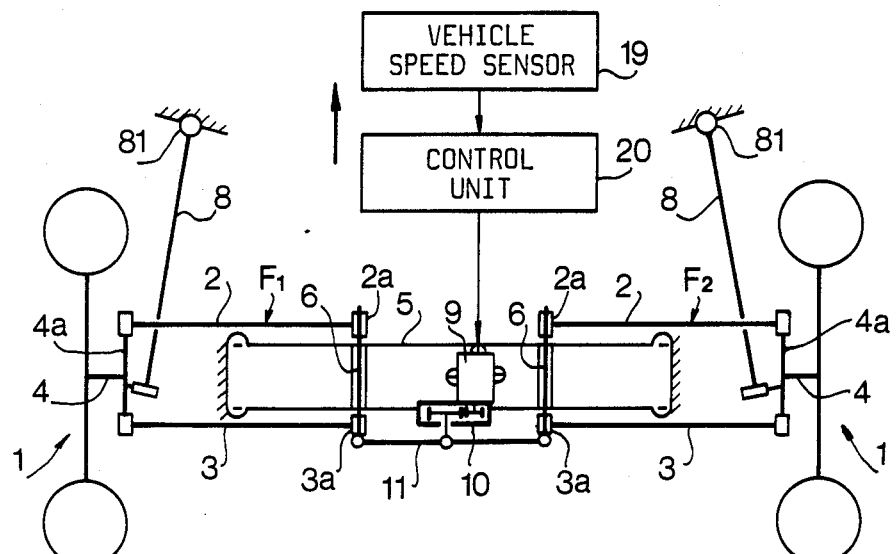
FIG. 1 is a schematic plan view showing a suspension system of the present invention.

Referring to FIG. 1 showing a rear wheel suspension system, a pair of rear wheels 1 are rotatably supported on frames F1 and F2 through axles 4, respectively. Each frame has a rectangular shape and comprises a pair of links 2, 3 laterally disposed with respect to a body of a motor vehicle and longitudinally disposed link 4a and shaft 6.

Figure 4:
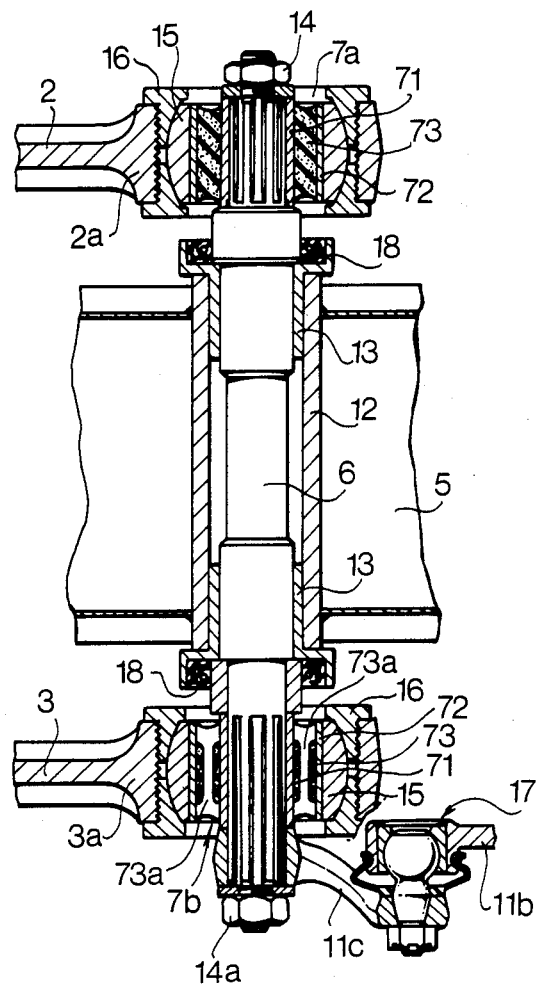
FIG. 4 is an enlarged sectional view a part of the system of FIG. 1.
Figure 5:
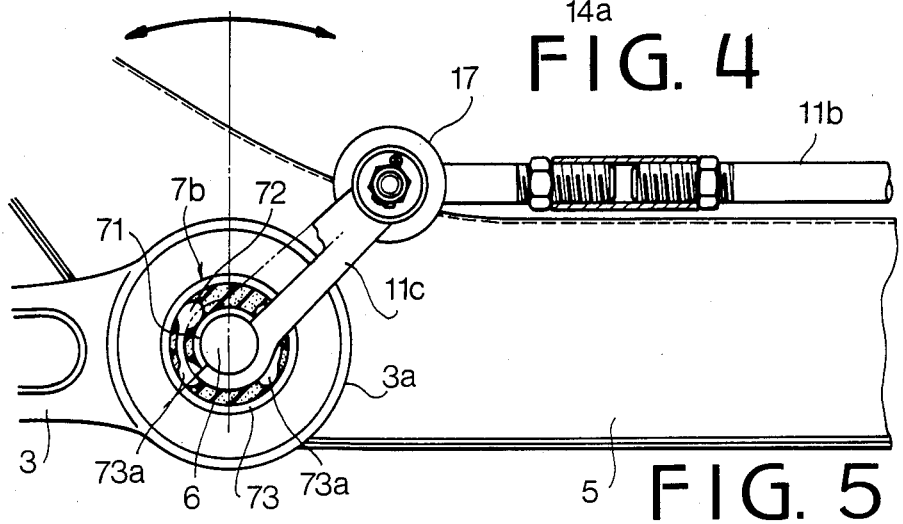
FIG. 5 is a front view of FIG. 4.

Referring to FIG. 4, the shaft 6 is rotatably supported on a cross member 5 of the body through bearings 13 mounted in a sleeve 12 secured to the cross member 5. An oil seal 18 is provided in the outer end of each bearing 13. Links 2 and 3 are connected to both ends of the shaft 6 through rubber bushes 7a and 7b, respectively.

Figure 3A:
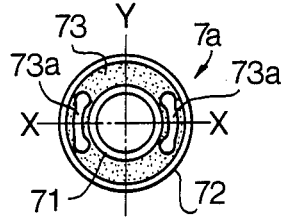
FIGS. 3a and 3b show rubber bushes.
Figure 3B:
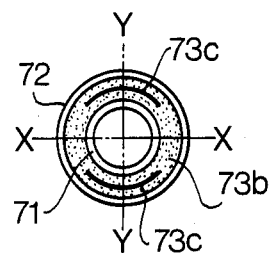

As shown in FIG. 3a, the rubber bush 7a comprises an inner sleeve 71, an outer sleeve 72 coaxial with the inner sleeve 71 and an annular rubber member 73 disposed between both sleeves 71, 72 and secured thereto. The rubber member 73 has diametrically opposed and circumferentially extending slits 73a. Accordingly, the spring constant in the X—X direction passing the slits 73a is smaller than the spring constant in the Y—Y direction perpendicular to the X—X direction. Referring to FIG. 3b, a rubber member 73b having opposite metal plates 73c on the Y—Y line may be used instead of the rubber member 73.

Referring to FIG. 4, the inner sleeve 71 engages with the shaft 6 with splines and the outer sleeve 72 is secured to a collar 15 having a spherical periphery which is secured to a pair of retainers 16. The retainers 16 of both rubber bushes 7a, 7b are rotatably mounted in holes of links 2, 3 at ends 2a, 3a, respectively, so that the links 2, 3 are rotatably supported on the shaft 6 through rubber bushes 7a, 7b. Rubber bush 7a is held by a nut 14 engaged with an end of shaft 6. On the other end of the shaft 6, an arm 11c is engaged with splines and rubber bush 7b and arm 11c are held by a nut 14a.

Figure 2:
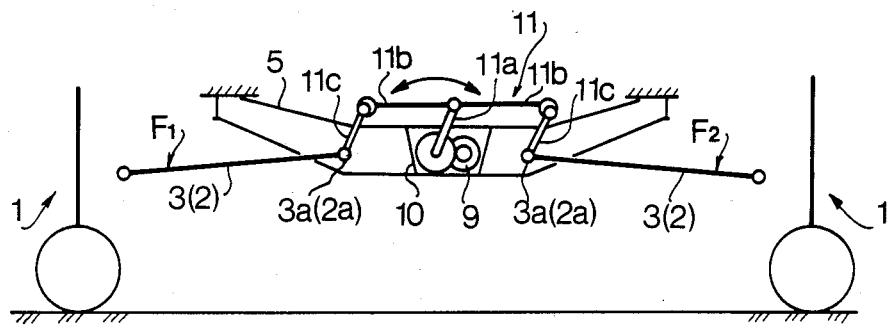
FIG. 2 is a front view of the system.

As shown in FIGS. 1 and 2, arms 11c of both frames F1 and F2 are connected to a connecting rod 11b through joints 17 (FIG. 4), in the form a parallel link 11. The central portion of connecting rod 11b is connected to an arm 11a which is secured to an output shaft of a reduction gear device 10 for a motor 9. The system is provided with a vehicle speed sensor 19 and a control unit 20 for driving the motor 9 in accordance with vehicle speed.

Further, link 4a of each frame is connected to the body by a radius rod 8 at a forward end 81 to rear the load on the wheel in the longitudinal direction.

Figure 6A:
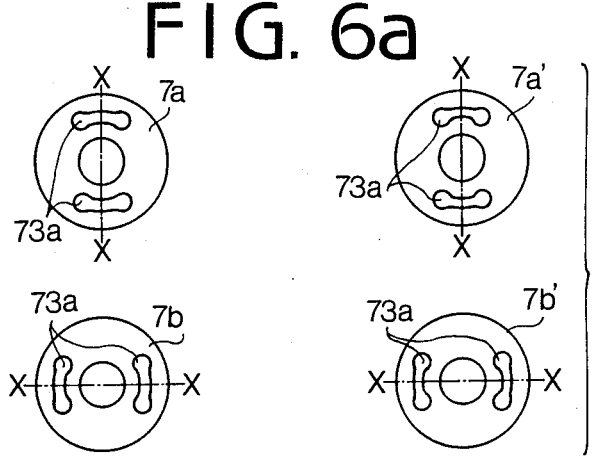
FIG. 6a to 6c show various angular positions of rubber bushes.

FIG. 6a shows angular positions of the rubber bushes in a low vehicle speed range. References 7a and 7b disignate left front and left rear rubber bushes and references 7a' and 7b' designate right front and right rear rubber bushes. The front rubber bushes 7a and 7a' are disposed such that the opposite slits 73a of each bush are arranged on a line in the vertical direction to reduce the spring constant in the vertical direction. To the contrary, the rear rubber bushes 7b and 7b' are disposed such that opposite slits 73a are arranged on a line in the horizontal direction.

In such an arrangement of the rubber bushes, when the vehicle negotiates a corner at low speed, side force exerts on the wheels 1 to compress the rear rubber bushes 7b, 7b' more than the front rubber bushes 7a, 7a'. Accordingly, the inner wheel on turns becomes toe-in and the outer wheel becomes toe-out by the deflections of rubber bushes. Namely, the rear wheels 1 are turned in the direction reverse to the front wheels, which improves the steerability at low vehicle speed.

Figure 6B:
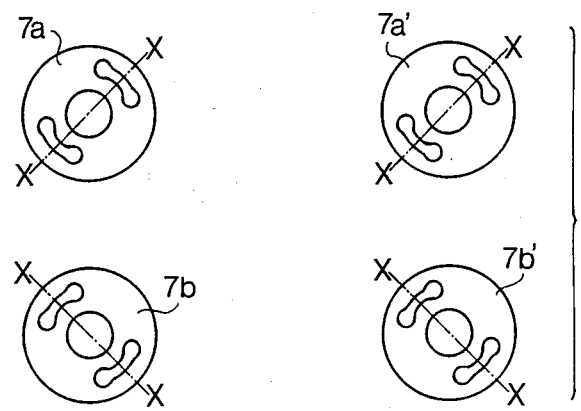

At middle vehicle speed, the control unit 20 produces an output signal dependent on the signal from the vehicle speed sensor 19 to rotate the arm 11 in the clockwise direction by 45 degrees in FIG. 2, so that rubber bushes 7a to 7b' are angularly positioned as shown in FIG. 6b. In the position of FIG. 6b, spring constants of rubber bushes 7a, 7a' against the side force are equal to that of rubber bushes 7b, 7b'. Accordingly, toes of wheels do not change at cornering, thereby improving steerability at middle vehicle speed.

Figure 6C:
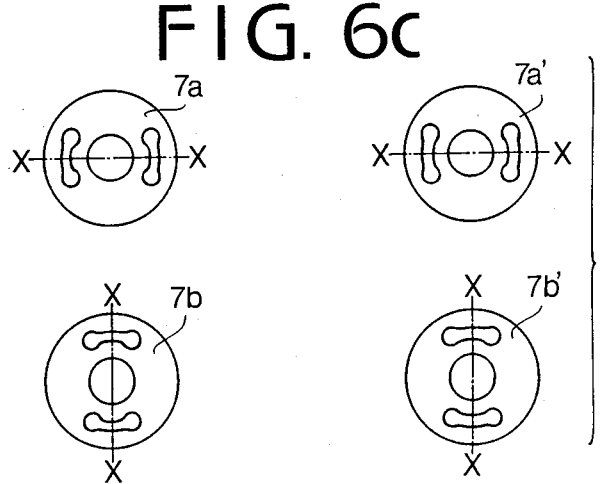

In a high vehicle speed range, the rubber bushes are further rotated 45 degrees in the clockwise direction, as shown in FIG. 6c. In the positions, the spring constant of each front bush becomes small against the side force. Accordingly, at cornering, the inner wheel becomes toe-out and the outer wheel becomes toe-in, which is the same direction as the steering direction of the front wheels. Therefore, the stability in steering at high vehicle speed is improved.

Although, in the above described embodiment, spring constants of all rubber bushes are changed in accordance with vehicle speed, it is possible to arrange such that one of the front and rear bushes is constructed to be changed in spring constant. For example, the spring constant of each of the rear rubber bushes is constant, and the spring constant of each front rubber bush is changed into high, middle, and low degrees.

It is possible to control the spring constant of each rubber bush in accordance with driving condition other than vehicle speed, such as engine speed, acceleration, deceleration, steering angle, and yaw rate, by using one or more driving conditions.

Figure 7:
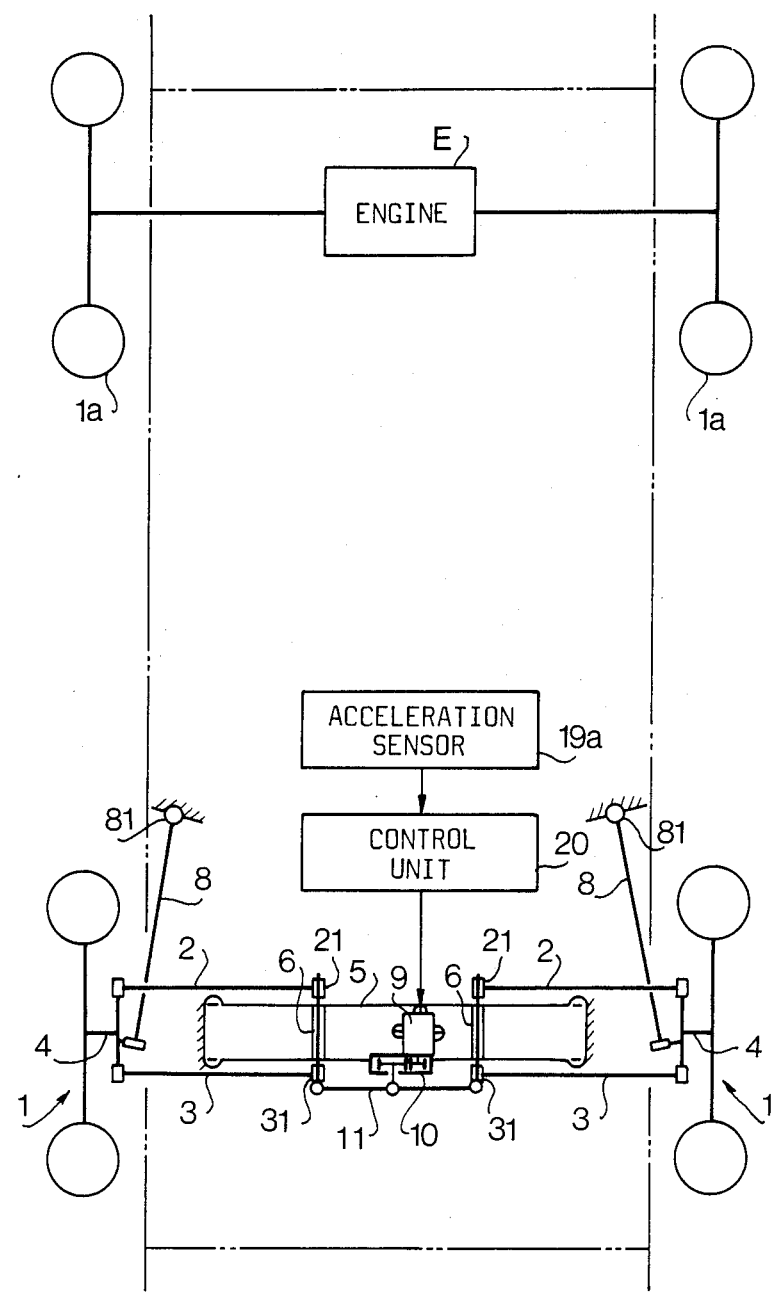
FIG. 7 shows another embodiment of the invention.

FIG. 7 shows another embodiment of the invention. The vehicle employed with the suspension system has an engine E mounted on a front portion of the vehicle body and front wheels 1a are driven by the front engine (hereinafter called FF vehicle). The suspension system has an acceleration (deceleration) sensor 19a the output signal of which is applied to control unit 20. Other parts are the same as the first embodiment in construction and identified by the same numerals.

Figure 8A:
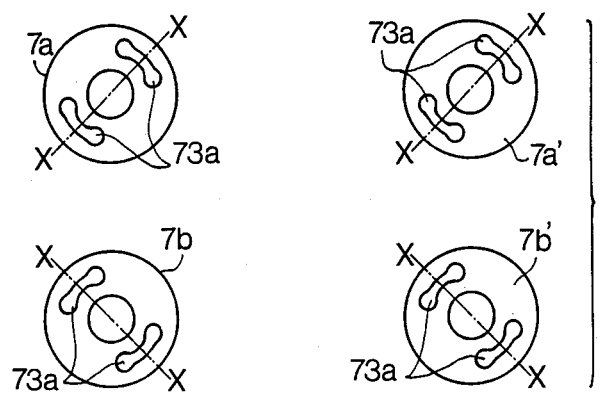
FIG. 8a to 8c show various angular positions of rubber bushes in the system of FIG. 7.

In steady driving state, the rubber bushes 7a to 7b' are disposed as shown in FIG. 8a, where spring constants of all bushes are the same.

Generally, the FF vehicle has a tendency of understeer at cornering an acceleration state.

Figure 8B:
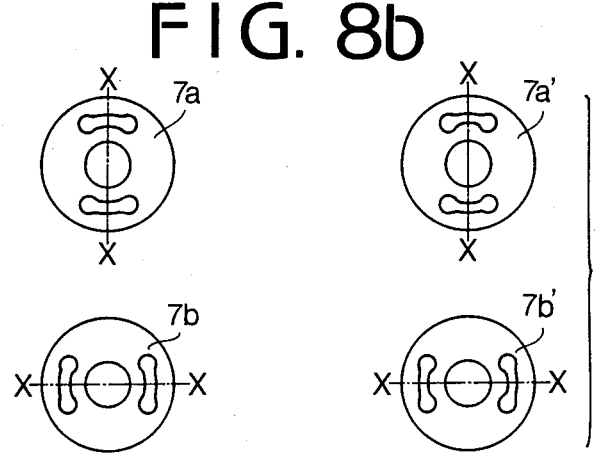

In the system of FIG. 7, the rubber bushes 7a to 7b' are angularly positioned as shown in FIG. 8b at cornering in acceleration state. In the position, inner wheel becomes toe-in and outer wheel becomes toe-out by the side force.

Figure 8C:
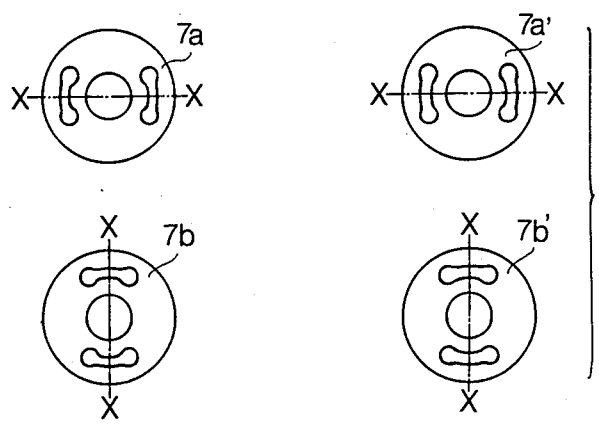

To the contrary, a rear wheel drive vehicle has an oversteer tendency. Accordingly, the rubber bushes 7a to 7b' are disposed as shown in FIG. 8c at cornering in acceleration state.

The vehicle may have an oversteer tendency at deceleration. Accordingly, the rubber bushes of the vehicle including the FF vehicle are disposed as shown in FIG. 8c, so that the oversteer can be prevented. The deceleration is detected, when the acceleration sensor 22 in FIG. 7 produces a negative going signal.

Figure 9:
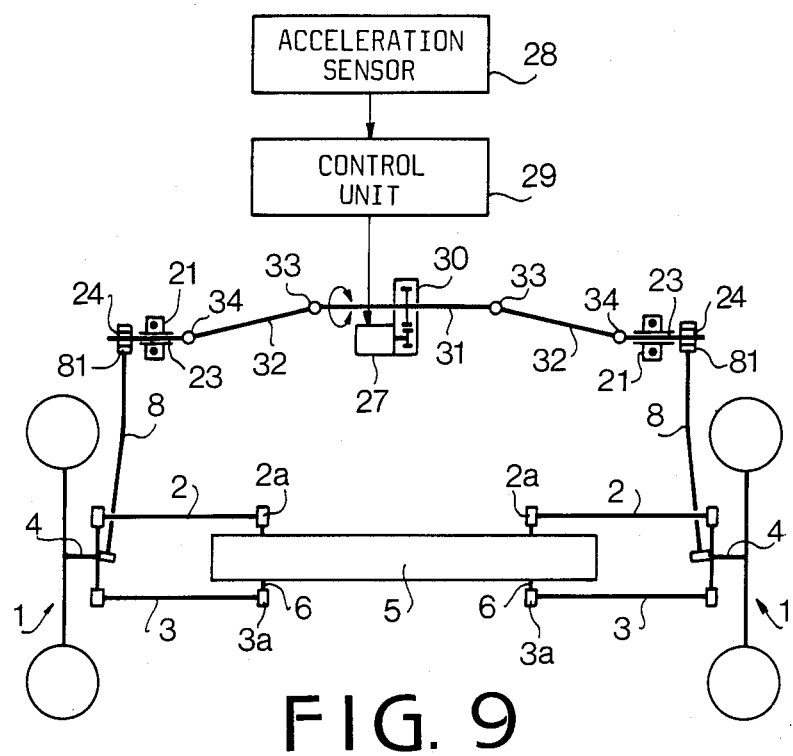
FIG. 9 shows a further embodiment of the invention.
Figure 10:
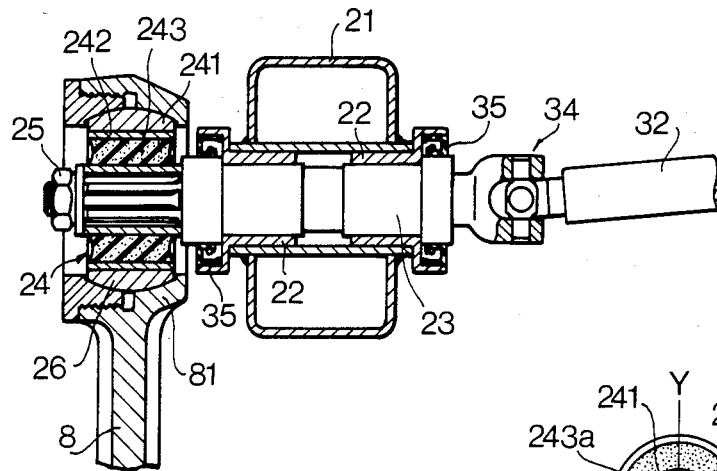
FIG. 10 is an enlarged sectional view of a part of FIG. 9.
Figure 11:
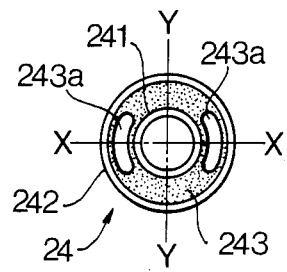
FIG. 11 shows a rubber bush in FIG. 10.

Referring to FIGS. 9 and 10 showing a further embodiment of the invention, the forward end 81 of each radius rod 8 is rotatably supported through a rubber bush 24 on a horizontal shaft 23 which is rotatably supported in a bracket 21 through bearings 22 sealed by oil seals 35. The rubber bush 24 is the same as the rubber bush 7a of the first embodiment in construction. Namely, the rubber bush comprises an inner sleeve 241, an outer sleeve 242 and an annular rubber member 243 disposed between sleeves 241 and 242. The rubber member 243 has opposite slits 243a to reduce the spring constant in the diametrical direction passing both slits. The inner sleeve 241 is engaged with the shaft 23 with splines and held by a nut 25 engaged with the shaft 23. The outer sleeve 242 engages with a collar 26 having a spherical periphery which is rotatably engaged with the end 81. The shaft 23 is operatively connected to a motor 27 through a universal joint 34, shaft 32, universal joint 33 and reduction device 30. The motor 27 is controlled by an output signal of a control unit 29 in accordance with driving conditions, for example vehicle speed sensed by an acceleration sensor 28. Other parts are the same as FIG. 1 and identified by same reference numerals.

When the acceleration sensor 28 detects acceleration or deceleration larger than a predetermined value, the control unit 29 produces an output signal to drive the motor 27 to rotate the shaft 23. The rubber bush 24 is positioned in such a position that the Y—Y line having a large spring constant coincides with the axial direction of the radius rod 8. Thus, the rubber bush 24 bears a large load caused by the acceleration or deceleration, thereby preventing excessive change of the toe angle. In steady state, the rubber bush 24 is positioned such that the X—X line having a small spring constant coincides with the axial direction of the radius rod 8. Thus, noises, vibration of the body and others are reduced. It is preferable to provide an engine speed sensor to control the motor 27, so that the vibration caused by engine speed may also be reduced. Further, the systems of FIG. 1 and FIG. 9 can be combined to more improve the driveability of the vehicle.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. A suspension system for a motor vehicle having at least one swing member for pivotaly connecting one of wheels of the motor vehicle to a body of the vehicle, comprising:
   a shaft rotatably supported on the body;
   an annular elastic bush secured to the shaft,
   the annular elastic bush having spring constants which are different in value at angular positions;
   the swing member being rotatably engaged with the elastic bush; and
   means for rotating the shaft in accordance with driving conditions of the motor vehicle so as to change the spring constants with respect to the swing member.

2. The suspension system according to claim 1 wherein the annular elastic bush comprises an inner sleeve secured to the shaft, an outer sleeve rotatably engaged with an end of the swing member, and an annular rubber member disposed between the inner and outer sleeves and secured thereto.

3. The suspension system according to claim 1 wherein the means comprises a motor for rotating the shaft, a control unit, and a sensor for detecting a driving condition.

4. The suspension system according to claim 2 wherein the annular rubber member has a pair of diametrically opposed slits.

5. The suspension system according to claim 2 wherein the annular member has a pair of diametrically opposed metal plates.

* * * * *